(12) United States Patent
Bauck (10) Patent No.: US 11,099,587 B2
(45) Date of Patent: Aug. 24, 2021

(54) WASTE OIL PUMP CONTROL AND TANK LEVEL MONITOR

(71) Applicant: Graco Minnesota Inc., Minneapolis, MN (US)

(72) Inventor: Mark L. Bauck, Coon Rapids, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 101 days.

(21) Appl. No.: 16/155,542

(22) Filed: Oct. 9, 2018

(65) Prior Publication Data

US 2020/0110428 A1 Apr. 9, 2020

(51) Int. Cl.
*G05D 9/12* (2006.01)

(52) U.S. Cl.
CPC ..................... *G05D 9/12* (2013.01)

(58) Field of Classification Search
CPC .................... G05D 9/12; B67D 7/04
See application file for complete search history.

(56) References Cited

U.S. PATENT DOCUMENTS

| | | | |
|---|---|---|---|
| 1,337,408 A | 4/1920 | Morris | |
| 1,651,616 A | 12/1927 | Morrison | |
| 3,810,487 A | 5/1974 | Cable et al. | |
| 4,193,487 A | 3/1980 | Takeuchi | |
| 4,244,385 A * | 1/1981 | Hotine | G01F 23/243 137/1 |
| 4,420,023 A | 12/1983 | Cislak | |
| 4,474,204 A * | 10/1984 | West | G05D 9/12 137/88 |
| 4,997,003 A | 3/1991 | Brennan | |
| 5,005,615 A | 4/1991 | McGarvey et al. | |
| 5,184,939 A | 2/1993 | Solomon et al. | |
| 5,203,677 A | 4/1993 | Lix et al. | |
| 5,273,085 A | 12/1993 | Edwards et al. | |
| 5,452,695 A | 9/1995 | Bedi | |
| 5,562,181 A | 10/1996 | Elkin et al. | |
| 5,586,583 A | 12/1996 | Edwards et al. | |
| 5,755,136 A | 5/1998 | Getman et al. | |
| 6,299,600 B1 * | 10/2001 | Masaoka | A61M 5/14232 604/118 |
| 7,628,918 B2 | 12/2009 | Bovaird | |
| 8,561,462 B2 | 10/2013 | Arnold et al. | |

(Continued)

OTHER PUBLICATIONS

International Search Report and Written Opinion for PCT Application No. PCT/US2019/054993, dated Jan. 28, 2020, pp. 13.

*Primary Examiner* — Angelisa L. Hicks
(74) *Attorney, Agent, or Firm* — Kinney & Lange, P. A.

(57) ABSTRACT

A waste oil transfer system includes a system controller configured to determine the authorization status of a waste oil transfer request. The system controller requests a current fluid level in a storage tank from a tank level monitor mounted on the storage tank. The tank level monitor is configured to generate current fluid level information and provide that information to the system controller. The system controller determines the available space in the storage tank and compares the available space to the transfer volume to determine if the storage tank can receive the transfer volume. The system controller then activates a pump to initiate the transfer if the system controller determines that the transfer is authorized or denies the transfer.

20 Claims, 3 Drawing Sheets

(56) References Cited

U.S. PATENT DOCUMENTS

| | | |
|---|---|---|
| 9,188,474 B2 | 11/2015 | Bianco |
| 2002/0139438 A1* | 10/2002 | Lange .................. B67D 7/3209 |
| | | 141/231 |
| 2003/0000279 A1* | 1/2003 | Satou ....................... B21D 5/02 |
| | | 72/441 |
| 2005/0053520 A1* | 3/2005 | Masaoka ................. A61L 2/186 |
| | | 422/62 |
| 2007/0012375 A1 | 1/2007 | Fannon, III et al. |
| 2009/0303059 A1 | 12/2009 | Von Lintzgy et al. |
| 2010/0312601 A1 | 12/2010 | Lin |
| 2013/0105182 A1* | 5/2013 | McLoughlin ............ G05D 9/12 |
| | | 169/46 |
| 2014/0356499 A1 | 12/2014 | Palazzo et al. |
| 2015/0144336 A1* | 5/2015 | Hardin ................... E21B 43/26 |
| | | 166/250.01 |
| 2015/0261227 A1* | 9/2015 | Wiersma ................. G05D 9/00 |
| | | 137/386 |

\* cited by examiner

WASTE OIL PUMP CONTROL AND TANK LEVEL MONITOR

BACKGROUND

The present disclosure relates generally to the transfer of waste oil. More specifically, the present disclosure relates to a system for authorizing and tracking waste oil transfers.

Waste oil is generated in a variety of manners, such as motor oil removed from machinery and vehicles during routine maintenance and cooking oil generated by restaurants. The waste oil requires proper on-site storage prior to removal. The waste oil is typically emptied into an initial collection vessel from which the waste oil is pumped into a high-volume storage tank. The waste oil is stored in the storage tank until the waste oil can be removed and transported off-site for proper disposal. A pump is connected to the collection vessel to facilitate the transfer of waste oil from the collection vessel to the storage tank. A technician operates the pump to transfer the waste oil. However, the technician typically does not know the remaining volume in the storage tank, so there may not be sufficient room in the storage tank for the waste oil from the collection vessel, which can lead to an incomplete transfer or oil spillage. After a full storage tank is recognized, a service call must be placed with the off-site oil disposer, which creates a period of time during which the storage tank is full and unable to accept any additional waste oil.

SUMMARY

According to one aspect of the disclosure, a waste oil transfer system includes a collection vessel capable of storing a first volume of fluid, a storage tank capable of storing a second volume of fluid larger than the first volume of fluid, a tank level monitor mounted on the storage tank, a pump disposed between and fluidly connected to the collection vessel and the storage tank, and a system controller. The tank level monitor is configured to sense an actual fluid level in the storage tank and to generate current level information based on the sensed fluid level. The system controller is configured to communicate with the tank level monitor to activate the tank level monitor and receive the current fluid level information from the tank level monitor, to determine an available capacity of the storage tank based on the current fluid level information, to authorize or deny a transfer of fluid from the collection vessel to the storage tank based on a comparison of the available capacity and a transfer volume from the collection vessel, and to activate the pump based on the transfer being authorized.

According to another aspect of the disclosure, a method includes initiating, by a system controller, a waste oil transfer for a transfer volume of waste oil; sending, by a system controller, a current fluid level inquiry to a tank level monitor mounted on a storage tank; generating, with the tank level monitor, a current fluid level reading for the storage tank; sending the current fluid level reading from the tank level monitor to the system controller; calculating, by the system controller, an available space in the storage tank for receiving additional waste oil based on the current fluid level reading; comparing, by the system controller, the available space to the transfer volume; and authorizing the waste oil transfer based on the comparison of the available space and the transfer volume indicating that the available space is greater than or equal to the transfer volume.

According to yet another aspect of the disclosure, a system controller for authorizing a transfer of a transfer volume of waste oil from a collection vessel to a storage tank having a tank level monitor with a pump, the tank level monitor configured to sense an actual fluid level in the storage tank and to generate current level information based on the sensed fluid level includes control circuitry; and a memory encoded with instructions that, when executed by the control circuitry, cause the system controller to send a current fluid level inquiry to the tank level monitor, to generate an available volume in the storage tank based on a comparison of the actual fluid level received from the tank level monitor and a maximum fluid level for the storage tank, to compare the available volume to the transfer volume, and to authorize or deny the transfer based on the comparison of the available volume and the transfer volume.

According to yet another aspect of the disclosure a waste oil transfer controller includes control circuitry; and a memory encoded with instructions that, when executed by the control circuitry, cause the waste oil transfer controller to: send a current fluid level inquiry to a tank level monitor mounted on a storage tank; receive a current fluid level reading for the storage tank from the tank level monitor; calculating an available space in the storage tank for receiving additional waste oil based on the current fluid level reading; comparing the available space to a transfer volume of waste oil; and authorize the waste oil transfer based on the comparison of the available space and the transfer volume indicating that the available space is greater than or equal to the transfer volume.

DETAILED DESCRIPTION

Figure 1:
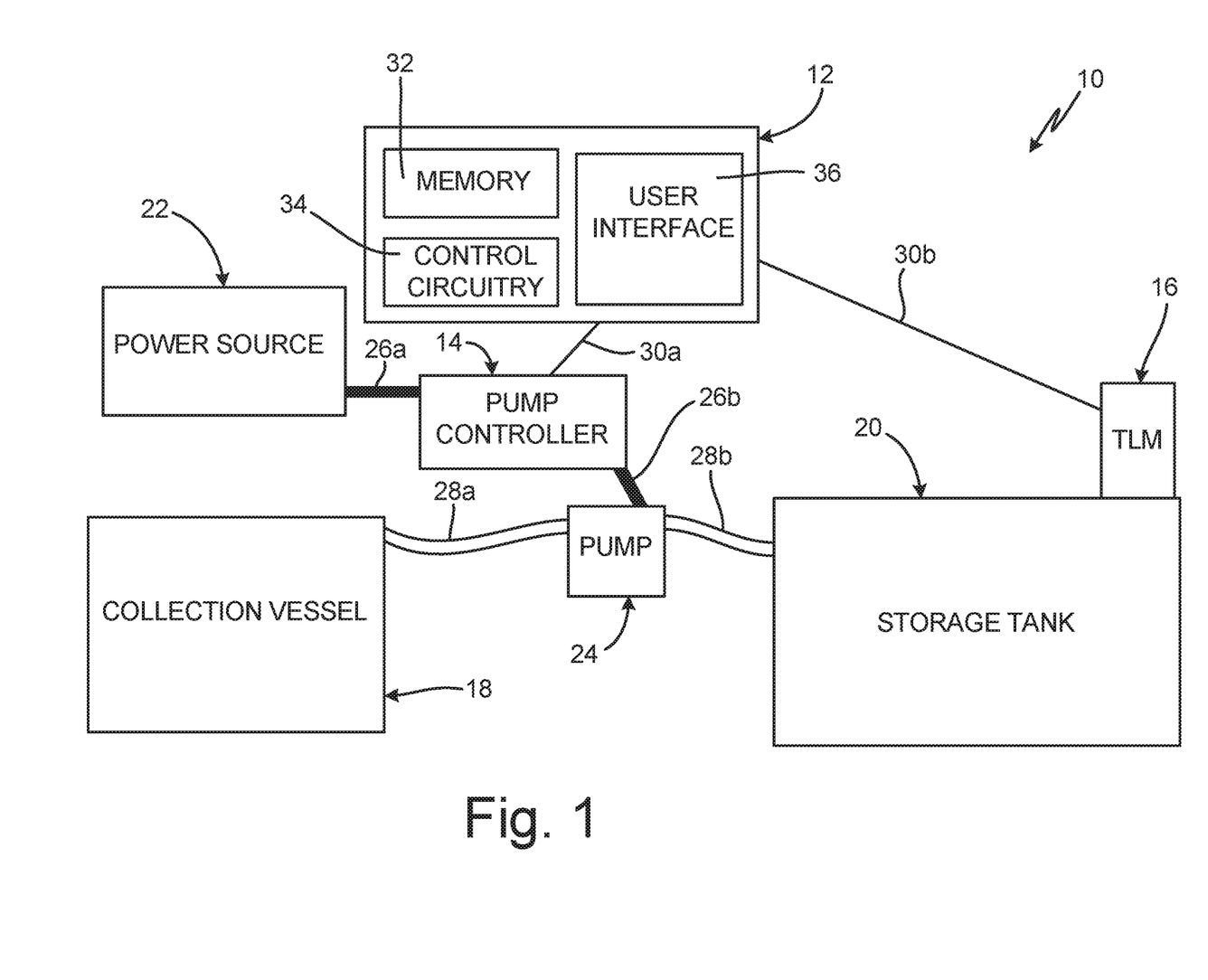
FIG. 1 is a block diagram of a waste oil transfer system.

FIG. 1 is a block diagram of waste oil transfer system 10. Waste oil transfer system 10 includes system controller 12, pump controller 14, tank level monitor (TLM) 16, collection vessel 18, storage tank 20, power source 22, pump 24, pump control lines 26a and 26b, transfer lines 28a and 28b, and communication links 30a and 30b. System controller 12 includes memory 32, control circuitry 34, and user interface 36.

Waste oil transfer system 10 is a system for authorizing and tracking transfers of waste oil between collection vessel 18 and storage tank 20. Waste oil is oil that is no longer suitable for its intended purpose due to contamination or the loss of original properties, such as motor oil that is removed from a motor vehicle during an oil change.

Collection vessel 18 is the vessel that initially captures the waste oil as it is removed during servicing. Collection vessel 18 can be any suitable vessel for collecting the waste oil. Collection vessel 18 typically has a capacity of 25-50 gallons, but it is understood that collection vessel 18 can be of any desired volume. Collection vessel 18 can be moved to any desired location within the facility to receive the waste oil. When collection vessel 18 requires emptying, collection vessel 18 is transferred to a location where collection vessel 18 can be connected to transfer line 28a.

Transfer line 28a extends from collection vessel 18 to pump 24, and transfer line 28b extends from pump 24 to storage tank 20. Pump 24 draws waste oil out of collection vessel 18 via transfer line 28a and pumps the waste oil to storage tank 20 via transfer line 28b. Pump 24 is typically a diaphragm pump, such as a double diaphragm pump, but it is understood that pump 24 can be any desired pump capable of transferring of waste oil from collection vessel 18 to storage tank 20. For example, pump 24 can be a piston pump, a peristaltic pump, a progressive cavity pump, or a rotary gear pump, among other options.

Power source 22 is configured to provide power to pump 24. Pump control line 26a extends from power source 22 to pump controller 14 and pump control line 26b extends from pump controller 14 to pump 24. It is understood that pump 24 can be powered in any desired manner. For example, pump 24 can be a pneumatically-powered pump, a hydraulically-powered pump, or an electrically-powered pump.

Pump controller 14 controls activation and deactivation of pump 24 by controlling the flow of power, such as a working fluid or electricity, to pump 24 from power source 22. Pump controller 14 communicates with system controller 12 via communication link 30a. System controller 12 provides commands to pump controller 14 to actuate pump controller 14 between the on state, where pump controller 14 activates pump 24, and an off state, where pump controller 14 deactivates pump 24. Communication link 30a can be any desired wired or wireless communication link, such as serial communications (e.g., RS-232, RS-485, or other serial communications), radio frequency (RF) communications, digital communications (e.g., Ethernet), WiFi communications, cellular communications, or other wired and/or wireless communications.

In examples where pump 24 is pneumatically powered or hydraulically powered, pump controller 14 allows working fluid to flow to pump 24 when in the on state, and pump controller 14 prevents working fluid from flowing to pump 24 when in the off state. In examples where pump 24 is electrically powered, pump controller 14 electrically connects pump 24 to power source 22 when pump controller 14 is in the on state and electrically disconnects pump 24 from power source 22 when pump controller 14 is in the off state.

For example, where pump 24 is pneumatically-powered, power source 22 can be an air compressor configured to compress air and to provide the compressed air to pump 24 to power pump 24. Pump controller 14 can be a pump air controller, such as a solenoid-powered three-way valve, configured to control the flow of air to pump 24. Compressed air from power source 22 flows to pump controller 14 through pump control line 26a and from pump controller 14 to pump 24 through pump control line 26b.

In an example where pump 24 is hydraulically-powered, power source 22 is a source of hydraulic fluid, such as a hydraulic power unit. Pump controller 14 directs the flow of hydraulic fluid to pump 24 when pump controller 14 is in the on state and prevents the hydraulic fluid from flowing to pump 24 when pump controller 14 is in the off state.

In examples where pump 24 is electrically-powered, power source 22 is a source of electric power, such as the power grid or a generator. Pump controller 14 controls the flow of electricity to pump 24 to control operation of pump 24. For example, pump controller 14 can be a contact switch configured to shift positions based on commands from system controller 12. While pump controller 14 is described as separate from pump 24, it is understood that pump controller 14 can be integrated into pump 24.

Storage tank 20 is a high-volume container capable of storing large quantities of waste oil from multiple collection vessels 18. Storage tank 20 has a defined internal volume for receiving the waste oil. In some examples, storage tank 20 has a capacity of up to 500 gallons or more. Storage tank 20 stores the waste oil until an off-site hauler can retrieve the waste oil from storage tank 20 and transport the waste oil to a disposal facility.

TLM 16 is mounted to storage tank 20 and is configured to sense the fluid level within storage tank 20. In some examples, TLM 16 is battery-powered. Where TLM 16 is battery powered, TLM 16 does not continuously monitor the fluid level and/or volume in storage tank 20 in real time to conserve the battery life of TLM 16. TLM 16 communicates with system controller 12 via communication link 30b. System controller 12 can both send inquiries to TLM 16 via communication link 30b and receive information from TLM 16 via communication link 30b. Communication link 30b can be any desired wired or wireless communication link, such as serial communications (e.g., RS-232, RS-485, or other serial communications), radio frequency communications, digital communications (e.g., Ethernet), WiFi communications, cellular communications, or other wired and/or wireless communications.

System controller 12 is configured to monitor and control transfers of waste oil from collection vessel 18 to storage tank 20. It is understood that system controller 12 can be of any suitable configuration for controlling the transfer of waste oil, gathering data, processing data, etc. In some examples, system controller 12 can be implemented as a plurality of discrete circuitry subassemblies. In one example, control circuitry 34 is configured to implement functionality and/or process instructions. For instance, control circuitry 34 can be capable of processing instructions stored in memory 32. Examples of control circuitry 34 can include any one or more of a microprocessor, a controller, a digital signal processor (DSP), an application specific integrated circuit (ASIC), a field-programmable gate array (FPGA), or other equivalent discrete or integrated logic circuitry.

Memory 32, in some examples, can be configured to store information during operation. Memory 32, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 32 is a temporary memory, meaning that a primary purpose of memory 32 is not long-term storage. Memory 32, in some examples, is described as volatile memory, meaning that memory 32 does not maintain stored contents when power is turned off. Examples of volatile memories can include random access memories (RAM), dynamic random access memories (DRAM), static random access memories (SRAM), and other forms of volatile memories. In some examples, memory 32 is used to store program instructions for execution by control circuitry 34. Memory 32, in one example, is used by software or applications running on system controller 12 to temporarily store information during program execution.

Memory 32, in some examples, also includes one or more non-volatile computer-readable storage media. Memory 32 can be configured to store larger amounts of information than volatile memory. Memory 32 can further be configured for long-term storage of information. In some examples, memory 32 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 36, such as a keyboard, touchscreen, monitor, mouse, smartphone, tablet, or other suitable interface device, allows a user to interact with waste oil transfer system 10, such as by retrieving information from memory 32, receiving notifications, initiating the software stored in memory 32, and inputting additional information to memory 32, among other examples. User interface 36 can be integrated into system controller 12 or can be a device separate from system controller 12, such as a smartphone or tablet.

Waste oil transfer system 10 is configured to both monitor the unoccupied space in storage tank 20 that is available for receiving waste oil and authorize transfers of waste oil to storage tank 20 based on the unoccupied space in storage tank 20.

To initiate a transfer, the user, such as an auto shop technician, moves collection vessel 18 to a suitable transfer location and attaches transfer line 28a to collection vessel 18. The user initiates the transfer process via user interface 36. In some examples, system controller 12 will require the user to enter the type of collection vessel 18 utilized, which provides the transfer volume of waste oil to system controller 12. In other examples, system controller 12 defaults to a transfer volume equivalent to the largest volume collection vessel 18 stored in memory 32. System controller 12 is configured to authorize and initiate the waste oil transfer only when there is sufficient unoccupied space in storage tank 20 to receive the transfer volume.

System controller 12 sends a current fluid level inquiry to TLM 16 via communication link 30b. The current fluid level inquiry activates TLM 16. TLM 16 takes a fluid level reading of storage tank 20 and generates current level information, which is the current fluid level in storage tank 20. TLM 16 provides the current level information to system controller 12 via communication link 30b.

System controller 12 compares the current level information received from TLM 16 to the maximum fill level of storage tank 20 to determine whether storage tank 20 can receive the transfer volume from collection vessel 18. System controller 12 authorizes or denies the waste oil transfer based on a comparison between the transfer volume and the unoccupied space in storage tank 20. If there is sufficient unoccupied space in storage tank 20 to receive the transfer volume, then system controller 12 will authorize and initiate the waste oil transfer. If there is not sufficient unoccupied space in storage tank 20 to receive the transfer volume, then system controller 12 will deny the waste oil transfer. When system controller 12 determines that the waste oil transfer is authorized, system controller 12 generates an activate command and provides the activate command to pump controller 14. When system controller 12 determines that the waste oil transfer is denied, system controller 12 denies the waste oil transfer and can inform the user of the denial via user interface 36. While system controller 12 is described as comparing the transfer volume to the unoccupied space in storage tank 20, it is understood that system controller 12 can modify the unoccupied space in storage tank 20 by a safety factor before the comparison to ensure that storage tank 20 is not overfilled during the waste oil transfer. For example, when TLM 16 indicates that the actual fill level is 80% full, system controller 12 can modify that actual fill level by any desired safety factor; such as 1.02, 1.05, 1.10, etc.; to generate a modified fill level. System controller 12 then makes the comparison and authorizes or denies the waste oil transfer based on the modified fill level.

In some examples, system controller 12 calculates the unoccupied volume in storage tank 20 based on the dimensions of storage tank 20, which are stored in memory 32, and the current level information provided by TLM 16. System controller 12 compares the unoccupied volume in storage tank 20 to the transfer volume to determine whether to authorize or deny the waste oil transfer based on that comparison. If the transfer volume is less than the unoccupied volume, then system controller 12 authorizes the transfer. If the transfer volume is greater than the unoccupied volume, then system controller 12 denies the transfer.

In other examples, the maximum fluid level of storage tank 20 is stored in memory 32. System controller 12 compares the maximum fluid level from memory 32 to the current level information to generate a level difference, which is the amount that the current fluid level in storage tank 20 can increase before reaching the maximum fluid level. System controller 12 can calculate the expected fluid level increase for the transfer based on the transfer volume. For example, the expected fluid level increase for various transfer volumes can be stored in memory 32 and recalled by system controller 12, system controller 12 can calculate the expected fluid level increase based on the dimensions of storage tank 20 that are stored in memory 32, and/or the expected fluid level increase for discrete volumetric units, such as each additional gallon or liter added to storage tank 20, can be stored in memory 32 and recalled by system controller 12. System controller 12 compares the expected fluid level increase with the level difference and makes a determination whether to authorize or deny the waste oil transfer based on that comparison. If the difference between the maximum fill level and the actual fill level is larger than the expected fluid level increase caused by the transfer volume, then system controller 12 authorizes the transfer. If the difference between the maximum fill level and the actual fill level is smaller than the expected fluid level increase caused by the transfer volume, then system controller 12 denies the transfer.

As noted above, system controller 12 provides the activate command to pump controller 14 based on system controller 12 determining that the waste oil transfer is authorized. The activate command causes pump controller 14 to enter the on state, and pump controller 14 activates pump 24. Pump 24 draws the waste oil from collection vessel 18 through transfer line 28a and pumps the waste oil to storage tank 20 through transfer line 28b. After the transfer is complete, system controller 12 can provide a deactivate command to pump controller 14 via communication link 30a. The deactivate command causes pump controller 14 to return to the off state and deactivate pump 24. Collection vessel 18 can then be disconnected from transfer line 28a and utilized to collect additional waste oil. System controller 12 can inform the user that the waste oil transfer is complete via user interface 36.

System variables are stored in memory 32 and are utilized in the authorization process. The system variables can include, among others, the volume of specific collection vessels 18, the volume of the largest collection vessel 18 in the facility, and the maximum flow rate of pump 24. In some examples, the activate command can cause pump controller 14 to enter the on state for a set time period. The set time period can be based on the maximum flow rate of pump 24 and the transfer volume. In such an example, system controller 12 is not required to provide an explicit deactivate command to pump controller 14. Instead, pump controller 14 enters the off state based on the set time period elapsing. System controller 12 can also authorize pump controller 14 to activate for a set time period based on the maximum flow rate of pump 24 and the unoccupied space in storage tank 20.

By way of example, assume that storage tank 20 can accept an additional 200 gallons of waste oil before reaching a maximum capacity, that pump 24 has a maximum flow rate of 47 gallons/minute, and that collection vessel 18 has a capacity of 25 gallons. System controller 12 determines that the waste oil transfer is authorized based on the above parameters. System controller 12 can determine the set time period that pump controller 14 should be in the on state based on the above parameters. System controller 12 can authorize pump controller 14 to enter the on state and activate pump 24 for thirty-two seconds, based on the capacity of collection vessel 18 and the maximum flow rate of pump 24. Alternatively, system controller 12 can authorize pump controller 14 to enter the on state and activate pump 24 for 4.2 minutes, based on the available volume in storage tank 20 and the maximum flow rate of pump 24.

System controller 12 can also be configured to implement artificial upper and lower time limits on any authorized waste oil transfer. For example, system controller 12 can be configured to cause pump controller 14 to enter the on state for a maximum of two minutes for any waste oil transfer regardless of the transfer volume. After the two minute time period passes, pump controller 14 automatically returns to the off state. It is understood that any desired upper time limit can be utilized. The upper time limit prevents unnecessary wear on pump 24 due to pump 24 running for an extended period of time and prevents unintended wear on pump 24 due to user error, such as when the user enters a transfer volume of 200 gallons when the user intended to enter a transfer volume of 20 gallons. If the volume of waste oil to be transferred is greater than that that can be transferred within the upper time limit, then the user is required to initiate one or more additional waste oil transfers to ensure that the waste oil is fully transferred from collection vessel 18. In other examples, system controller 12 is configured to prompt the user, via user interface 36, to confirm the transfer volume entered and to then allow the user to override the upper time line.

The artificial lower time limit provides a factor of safety to ensure that storage tank 20 is not overfilled. Where the artificial lower time limit is utilized, system controller 12 compares the difference between the transfer volume associated with the artificial lower time limit and the available volume based on the current level information received from TLM 16. For example, assuming that the artificial lower time limit is 2 minutes and pump 24 has a maximum flow rate of 47 gallons/minute, system controller 12 will authorize the waste oil transfer only when the current level information from TLM 16 indicates that storage tank 20 has an unoccupied space capable of receiving at least 94 gallons of waste oil.

System controller 12 is further configured to generate orders and send notifications to an offsite waste oil disposer via external communication link 30. System controller 12 can generate a disposal order based on the actual fluid level in storage tank 20 nearing the maximum fluid level, or based on any other desired parameter. For example, system controller 12 can notify the offsite disposer based on the actual fill level received from TLM 16, based on the expected fill level after the currently authorized transfer is complete, and/or based on a number of expected transfers until storage tank 20 is full. System controller 12 can notify the offsite disposer based on storage tank 20 reaching any desired actual fill level, such as 80% full, 90% full, 95% full, or any other desired actual fill level. System controller 12 can be further configured to generate the disposal order based on temporal parameters, such as a number of days passing since the last disposal order was generated. System controller 12 generates the disposal order and can communicate the disposal order to the offsite disposer automatically, such as over the internet, or can prompt the user, via user interface 36, to send the disposal order.

Waste oil transfer system 10 provides significant advantages. Waste oil transfer system 10 ensures that a waste oil transfer is initiated only when storage tank 20 has sufficient capacity to accept the transfer volume from collection vessel 18. Waste oil transfer system 10 thereby ensures that collection vessel 18 is fully evacuated during each transfer and that storage tank 20 does not overflow. In addition, system controller 12 can automatically generate and send disposal orders to an offsite disposer when storage tank 20 requires emptying, thereby avoiding situations where storage tank 20 is unable to receive addition transfers of waste oil while waiting to be emptied. In addition, TLM 16 is activated and reads the actual fill level in storage tank 20 in response to the current fluid level inquiry from system controller 12, which preserves the battery life of TLM 16 as TLM 16 is not continuously reading and sending the actual fill level to system controller 12. System controller 12 also controls the activation, and in some examples the deactivation, of pump 24. Controlling the activation and deactivation of pump 24 ensures that collection vessel 18 is fully emptied and that pump 24 does not run for too long, thereby reducing wear on pump 24. Moreover, controlling deactivation of pump 24 based on system variables eliminates the need for system controller 12 to receive feedback from TLM 16 regarding the changing fluid level in storage tank 20 during the waste oil transfer. As such, waste oil transfer system 10 is not reliant on signals that are subject to interference, which increases user confidence and ensures that pump 24 will deactivate at the correct time.

Figure 2:
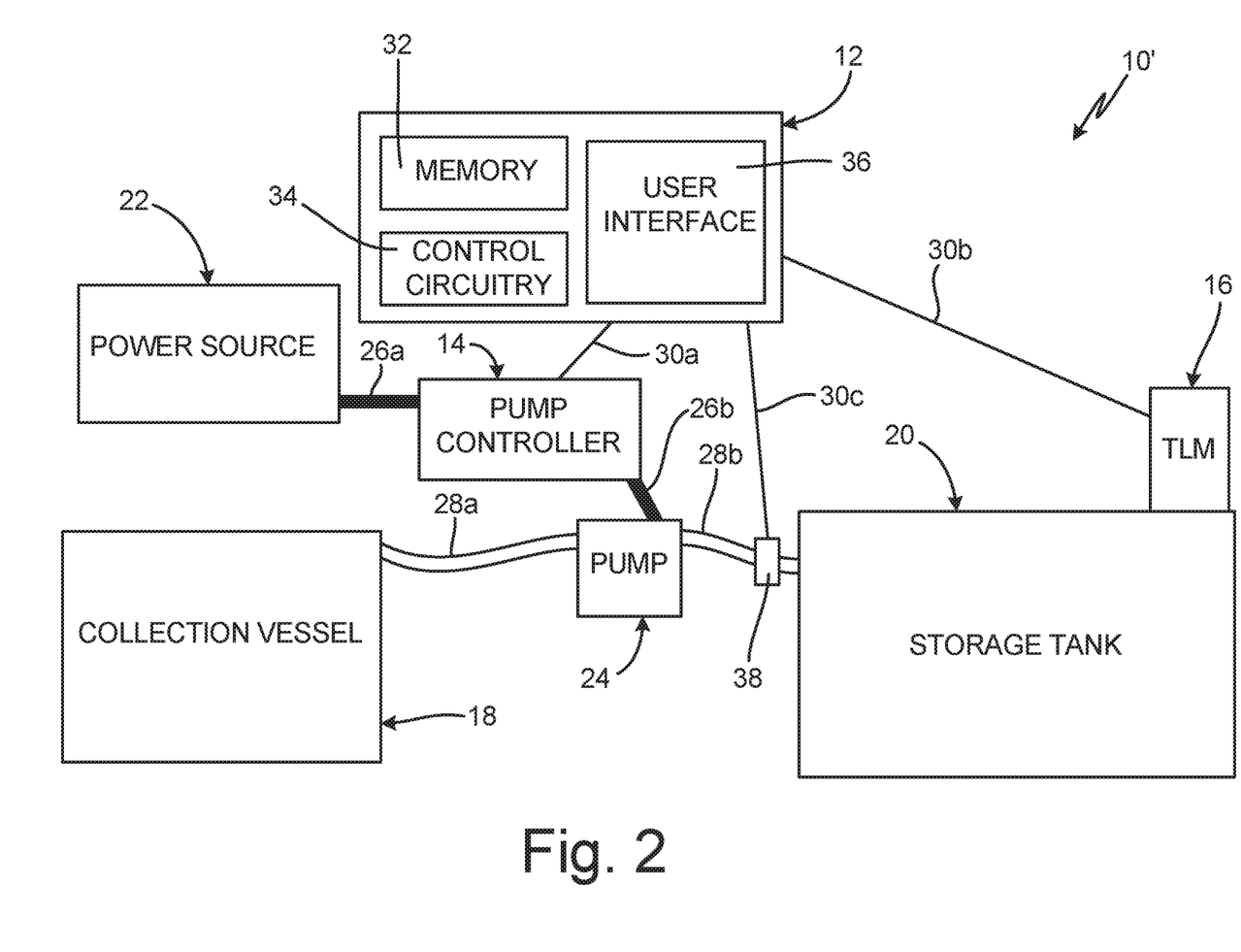
FIG. 2 is a block diagram of a waste oil transfer system.

FIG. 2 is a block diagram of waste oil transfer system 10' with volumetric meter 38. Waste oil transfer system 10' also includes system controller 12, pump controller 14, TLM 16, collection vessel 18, storage tank 20, power source 22, pump 24, pump lines 26a and 26b, transfer lines 28a and 28b, and communication links 30a, 30b, and 30c. System controller 12 includes memory 32, control circuitry 34, and user interface 36.

Waste oil transfer system 10' is similar to waste oil transfer system 10, except that waste oil transfer system 10' includes volumetric meter 38. Volumetric meter 38 is disposed on transfer line 28b that extends between pump 24 and storage tank 20. Volumetric meter 38 is configured to meter the flow of waste oil through transfer line 28b and to generate transferred volume information based on the metered flow. For example, volumetric meter 38 can be a rotary gear flow meter, a turbine flow meter, a paddle wheel meter, a piston meter, or any other desired meter capable of metering the flow of waste oil through transfer line 28b. Volumetric meter 38 includes circuitry for communicating the transferred volume information to system controller 12 via communication link 30c, which can be a wired or wireless communication link similar to communication link 30a and communication link 30b.

During a transfer, system controller 12 initially sends a current fluid level inquiry to TLM 16. TLM 16 takes a fluid level reading of the fluid in storage tank 20 and generates current level information, which TLM 16 sends to system controller 12. System controller 12 compares the current level information to the maximum fill level of storage tank 20 to determine whether storage tank 20 can accept the transfer volume from collection vessel 18. If system controller 12 determines that the waste oil transfer is authorized, then system controller 12 activates pump controller 14 and pump controller 14 activates pump 24.

As pump 24 drives the waste oil downstream through transfer line 28b, volumetric meter 38 tracks the volume of waste oil being pumped through transfer line 28b and generates the transferred volume information. Volumetric meter 38 communicates the transferred volume information to system controller 12 via communication link 30c. System controller 12 compares the tracked volume of waste oil to the authorized transfer volume. Once the tracked volume of waste oil reaches the authorized transfer volume system controller 12 knows that the transfer is complete. System controller 12 then sends a deactivate command to pump controller 14 to cause pump 24 to deactivate.

In some examples, system controller 12 modifies the authorized transfer volume by applying an adjustment factor, which creates a modified authorized transfer volume. The modified authorized transfer volume is larger than that the authorized transfer volume, to ensure that the full transfer volume from collection vessel 18 is transferred to storage tank 20. Air can be present in transfer line 28b as pump 24 pumps the waste oil to storage tank 20. Volumetric meter 38 is unable to account for the presence of air in transfer line 28b, and as such generates the transferred volume information as if transfer line 28b is 100% full throughout the waste oil transfer. The adjustment factor accounts for transfer line 28b being less than 100% full throughout the entire transfer, thereby ensuring that collection vessel 18 is fully emptied during the transfer. The adjustment factor can be of any desired value, such as 1.02, 1.05, 1.10, 1.25, or any other desired value that ensures that the full volume of collection vessel 18 is transferred. For example, if collection vessel 18 has a capacity of 25 gallons and the adjustment factor is 1.10, system controller 12 will deactivate pump 24 when volumetric meter 38 indicates that 27.5 gallons have been transferred to storage tank. System controller 12 can also implement an artificial upper time limit in addition to the adjustment factor to ensure that collection vessel 18 is fully emptied.

Figure 3:
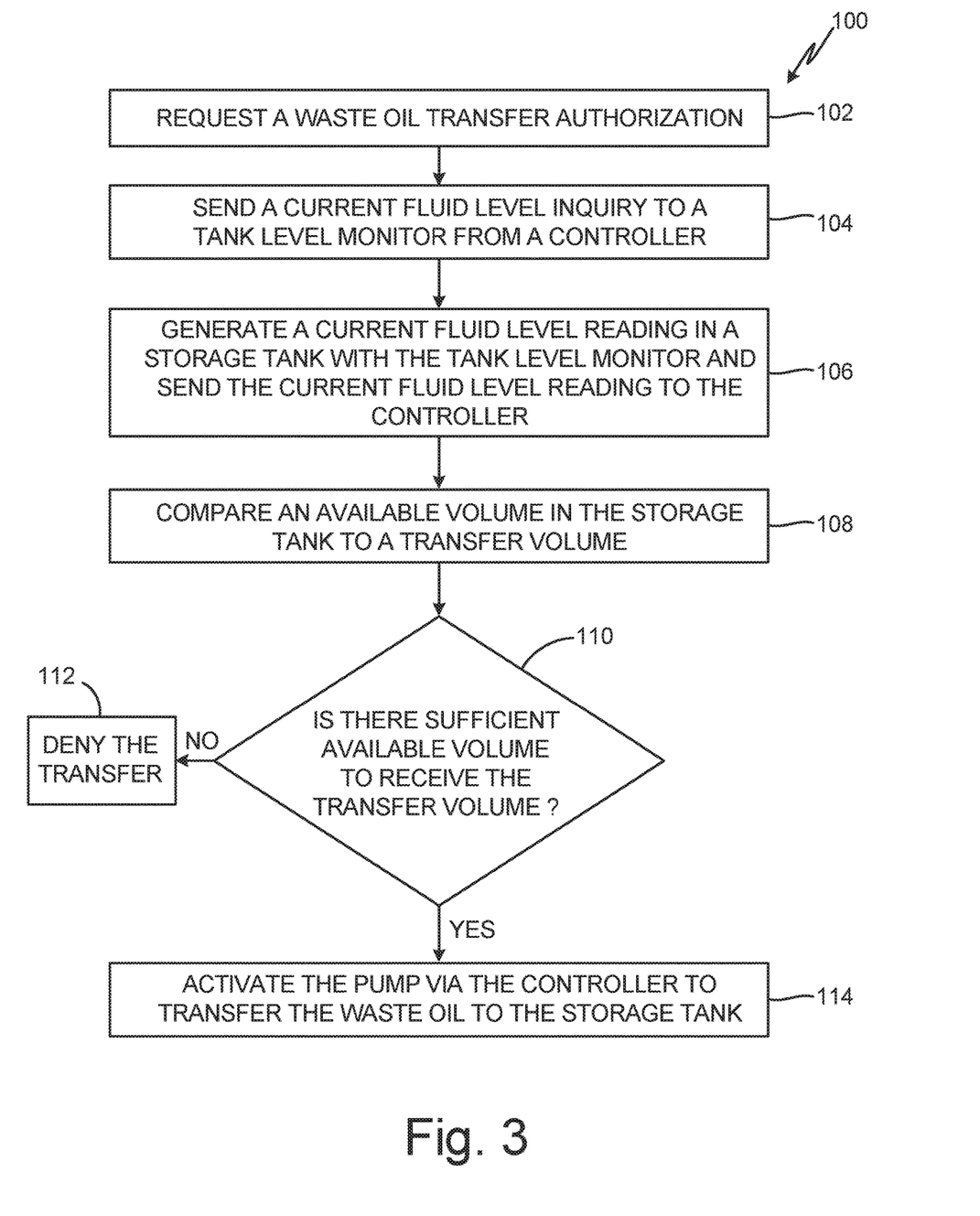
FIG. 3 is a flow chart illustrating a method of authorizing a transfer of waste oil and transferring waste oil.

FIG. 3 is a flow chart of illustrating method 100 of authorizing a transfer of waste oil. In step 102, a waste oil transfer is requested at a controller, such as system controller 12 (shown in FIGS. 1 and 2). The user provides relevant information to the controller via a user interface, such as user interface 36 (shown in FIGS. 1 and 2). The relevant information can include information such as the volume of the collection vessel, such as collection vessel 18 (shown in FIGS. 1 and 2), that the waste oil is going to be transferred from, among other information.

In step 104, the controller sends a fluid level inquiry to a tank level monitor, such as TLM 16 (shown in FIGS. 1 and 2). The fluid level inquiry activates the tank level monitor and causes the tank level monitor to read a fluid level in the storage tank, such as storage tank 20 (shown in FIGS. 1 and 2), that the waste oil is going to be transferred to.

In step 106, the tank level monitor reads the current fluid level in the storage tank, generates current level information regarding the current fluid level, and communicates the current level information to the controller. In step 108, the controller compares the current level information received from the tank level monitor to the transfer volume. In some examples, the controller includes firmware stored in the memory of the controller that, when executed by the control circuitry, converts the current level information to a current fluid volume in the storage tank. The controller determines the available volume in the storage tank by subtracting the current fluid volume from a maximum fluid volume for the storage tank. The controller then compares the available volume to the transfer volume to determine if there is sufficient volume remaining in the storage tank to accept the transfer volume.

In other examples, the firmware stored in the memory is configured to convert the transfer volume to an expected rise in the fluid level in storage tank. In such an example, the controller subtracts the current fluid level received from the tank level monitor from a maximum fluid level of storage tank, which is pre-stored in the memory. The controller thereby determines the available fluid level rise that the storage tank can accept. The firmware also includes instructions that, when executed by the control circuitry, convert the transfer volume to an expected fluid level rise. In some examples, the controller modifies the current level information from the tank level monitor by a safety factor to account for any inaccuracies in the current level information received from the tank level monitor. The safety factor increases the value of the current level information that is utilized by the controller during the comparison of step 108. The current level information is multiplied by the safety factor, which can be any desired value, such as 1.02, 1.05, 1.10, 1.15, or any other desired value, to ensure that the storage tank does not overflow during the waste oil transfer.

In step 110, the controller determines whether the storage tank has sufficient available capacity to receive the transfer volume from the collection vessel. The controller determines whether the storage tank has sufficient capacity based on the comparison made by the controller at step 108. If the comparison indicates that the transfer volume is greater than the available capacity of storage tank, then method 100 proceeds to step 112. In step 112, the controller denies the transfer and notifies the user that the transfer cannot be completed because the storage tank has insufficient available space to receive the transfer volume. For example, the controller can notify the user via the user interface. In some examples, the controller automatically notifies an offsite disposer that the storage tank is full and requires servicing.

If the comparison completed in step 108 indicates that the transfer volume is less than the available capacity of the storage tank, then method 100 proceeds to step 114. In step 114, the controller initiates the waste oil transfer. The controller sends an activate command to the pump controller, which causes the pump controller to enter an on state where the pump controller provides power to the pump. The pump pumps the waste oil from the collection vessel to the storage tank.

The controller can, either directly or indirectly, deactivate the pump to end the waste oil transfer. In some examples, the controller activates the pump for a set time period. The set period of time can be based on the transfer volume, the capacity of the pump, the available volume in the storage tank, minimum and/or maximum run times for the pump, among other factors. The pump is deactivated based on the pump having run for the set time period. In some examples, the controller can send a deactivate signal to the pump controller based on the set time period elapsing. In other examples, the activate command provided to the pump controller can cause the pump controller to enter the on state for only the set time period.

The controller can also control activation and deactivation of the pump based on feedback from other components in the waste oil transfer system, such as volumetric meter 38 (shown in FIG. 2). For example, the controller can deactivate the pump based on a comparison of the transferred volume, as indicated by the volumetric meter, and the transfer volume from collection vessel indicating that the full transfer volume has been transferred to the storage tank.

Method 100 provides significant advantages. The controller determines whether the storage tank has available space to accept the full transfer volume from collection vessel prior to initiating the waste oil transfer, which prevents partial transfers and overflow of the storage tank. In addition, the tank level monitor reads the fluid level in the storage tank only when pinged by the controller, which preserves the battery life of the tank level monitor. The controller can control both activation and deactivation of the pump, which ensures that waste oil transfers are initiated only when there is sufficient space to accept the waste oil and ensures that the full transfer volume is transferred.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A waste oil transfer system comprising:
    a collection vessel capable of storing a first volume of fluid;
    a storage tank capable of storing a second volume of fluid, the second volume being greater than the first volume;
    a tank level monitor mounted on the storage tank, wherein the tank level monitor is configured to sense an actual fluid level in the storage tank and to generate current fluid level information based on the actual fluid level;
    a pump disposed between and fluidly connected to the collection vessel and the storage tank; and
    a system controller configured to:
        communicate with the tank level monitor to receive the current fluid level information regarding the storage tank;
        determine an available capacity of the storage tank based on the current fluid level information;
        compare a transfer volume of fluid from the collection vessel to the available capacity to determine if the available capacity of the storage tank is one of greater than and equal to the transfer volume of fluid from the collection vessel; and
        authorize a full transfer of the transfer volume of fluid from the collection vessel to the storage tank based on the comparison indicating that the available capacity of the storage tank is one of greater than and equal to the transfer volume from the collection vessel.

2. The waste oil transfer system of claim 1, wherein the system controller comprises:
    control circuitry; and
    a memory encoded with instructions that, when executed by the control circuitry, cause the system controller to send a current fluid level inquiry to the tank level monitor, to generate an available volume based on a comparison of the actual fluid level and a maximum fluid level for the storage tank, to compare the available volume to the transfer volume, and to authorize or deny the transfer based on the comparison of the available volume and the transfer volume.

3. The waste oil transfer system of claim 1, further comprising:
    a pump controller operatively connected to the pump and configured to control the pump between an activated state and a deactivate state;
    wherein the system controller is configured to communicate with the pump controller to cause the pump controller to enter an on state and to activate the pump based on the transfer being authorized.

4. The waste oil transfer system of claim 3, wherein the pump is selected from a group consisting of a pneumatically-powered pump, a hydraulically-powered pump, and an electrically-powered pump.

5. The waste oil transfer system of claim 4, wherein the pump controller controls a flow of working fluid through the pump line from the power source to the pump.

6. The waste oil transfer system of claim 1, wherein the collection vessel is one of a plurality of collection vessels having a plurality of volumes, and wherein the transfer volume is based on a volume of a largest volume collection vessel of the plurality of collection vessels.

7. The waste oil transfer system of claim 1, further comprising:
    a volumetric meter disposed on a transfer line extending between the pump and the storage tank, wherein the volumetric meter is configured to generate transferred volume information and communicate the transferred volume information to the system controller.

8. The waste oil transfer system of claim 7, wherein the system controller is configured to compare the transferred volume information to the transfer volume and to deactivate the pump based on the transferred volume equaling or exceeding the transfer volume.

9. The waste oil transfer system of claim 7, wherein the system controller is configured to modify the transfer volume by an adjustment factor to generate a modified transfer volume, to compare the transferred volume to the modified transfer volume, and to deactivate the pump based on the transferred volume equaling or exceeding the modified transfer volume.

10. The waste oil transfer system of claim 1, wherein the system controller is configured to wirelessly communicate with the tank level monitor and the pump.

11. The waste oil transfer system of claim 10, wherein the controller is configured to communicate with the tank level monitor and the pump via radio frequency communication.

12. The waste oil transfer system of claim 1, wherein:
    the controller is configured to calculate a transfer period based at least in part on a maximum flow rate of the pump, and the controller is further configured to activate the pump for the transfer period.

13. The waste oil transfer system of claim 12, wherein the transfer period is further based on at least one of the transfer volume and the available volume.

14. A method comprising:
    initiating, by a system controller, a waste oil transfer for a transfer volume of waste oil from a collection vessel to a storage vessel, the collection vessel capable of storing a first volume of fluid and the storage vessel capable of storing a second volume of fluid larger than the first volume of fluid;
    sending, by the system controller, a current fluid level inquiry to a tank level monitor mounted on a storage tank;
    generating, with the tank level monitor, a current fluid level reading for the storage tank;

sending the current fluid level reading from the tank level monitor to the system controller;

calculating, by the system controller, an available space in the storage tank for receiving additional waste oil based on the current fluid level reading;

comparing, by the system controller, the available space to the transfer volume; and authorizing, by the system controller, the waste oil transfer based on the comparison of the available space and the transfer volume indicating that the available space is greater than or equal to the transfer volume.

15. The method of claim 14, wherein the step of authorizing, by the system controller, the waste oil transfer based on the comparison of the available space and the transfer volume indicating that the available space is greater than or equal to the transfer volume comprises:

activating, by the system controller, a pump, the pump disposed between the collection vessel and the storage tank and configured to pump the waste oil from the collection vessel to the storage tank.

16. The method of claim 15, wherein the step of activating, by the system controller, the pump comprises:

generating, by the system controller, an activate command;

sending, by the system controller, the activate command to a pump controller, wherein the activate command causes the pump controller to enter an on state; and connecting, by the pump controller, the pump to a power source based on the pump controller entering the on state.

17. The method of claim 16, wherein the activate command includes a deactivate command that instructs the pump controller to deactivate the pump based on a set time period passing after activation, wherein the set time period is based on a maximum flow rate of the pump.

18. The method of claim 14, wherein the step of initiating, by the system controller, the waste oil transfer for the transfer volume of waste oil comprises:

requesting, by a user interface, the waste oil transfer.

19. A system controller for authorizing a transfer of a transfer volume of waste oil from a collection vessel capable of storing a first volume of waste oil to a storage tank capable of storing a second volume of waste oil greater than the first volume, the storage tank having a tank level monitor and the transfer occurring with a pump, the tank level monitor configured to sense an actual fluid level in the storage tank and to generate current level information based on the actual fluid level sensed by the tank level monitor, the system controller comprising:

control circuitry; and a memory encoded with instructions that, when executed by the control circuitry, cause the system controller to send a current fluid level inquiry to the tank level monitor, to generate an available volume in the storage tank based on a comparison of the actual fluid level received from the tank level monitor and a maximum fluid level for the storage tank, to compare the available volume to the transfer volume from the collection vessel, and to authorize or deny the transfer based on the comparison of the available volume and the transfer volume.

20. A waste oil transfer controller comprising:

control circuitry; and a memory encoded with instructions that, when executed by the control circuitry, cause the waste oil transfer controller to:

send a current fluid level inquiry to a tank level monitor mounted on a storage tank;

receive a current fluid level reading for the storage tank from the tank level monitor;

calculate an available space in the storage tank for receiving additional waste oil based on the current fluid level reading;

compare the available space to a transfer volume of waste oil from a collection vessel having a maximum storage volume less than a maximum storage volume of the storage tank; and authorize a waste oil transfer based on the comparison of the available space and the transfer volume indicating that the available space is greater than or equal to the transfer volume.

* * * * *